(12) United States Patent
Loveless et al.

(10) Patent No.: US 9,121,081 B2
(45) Date of Patent: Sep. 1, 2015

(54) MULTI-FREQUENCY HEAT TREATMENT OF A WORKPIECE BY INDUCTION HEATING

(75) Inventors: Don L. Loveless, Rochester, MI (US); Valery I. Rudnev, Rochester Hills, MI (US)

(73) Assignee: INDUCTOHEAT, INC., Madison Heights, MI (US)

( * ) Notice: Subject to any disclaimer, the term of this patent is extended or adjusted under 35 U.S.C. 154(b) by 672 days.

(21) Appl. No.: 11/833,986

(22) Filed: Aug. 4, 2007

(65) Prior Publication Data

US 2007/0267407 A1    Nov. 22, 2007

Related U.S. Application Data

(62) Division of application No. 11/111,419, filed on Apr. 21, 2005, now Pat. No. 7,253,381.

(60) Provisional application No. 60/564,083, filed on Apr. 21, 2004.

(51) Int. Cl.
| | |
|---|---|
| *H05B 6/10* | (2006.01) |
| *H05B 6/14* | (2006.01) |
| *H05B 6/36* | (2006.01) |
| *C21D 1/42* | (2006.01) |
| *H05B 6/40* | (2006.01) |
| *C21D 9/32* | (2006.01) |
| *C21D 9/60* | (2006.01) |

(52) U.S. Cl.
CPC .. *C21D 1/42* (2013.01); *H05B 6/36* (2013.01); *H05B 6/40* (2013.01); *C21D 9/32* (2013.01); *C21D 9/60* (2013.01)

(58) Field of Classification Search
CPC .............. C21D 1/42; C21D 9/32; C21D 9/60; H05B 6/40; H05B 6/36
USPC ......... 219/661, 603, 617, 640, 654, 659, 662, 219/656, 667, 670, 673, 635, 646, 669; 266/125, 90; 336/221
See application file for complete search history.

(56) References Cited

U.S. PATENT DOCUMENTS

| | | | | |
|---|---|---|---|---|
| 3,472,987 A | * | 10/1969 | Viart | 219/610 |
| 4,708,325 A | * | 11/1987 | Georges | 266/90 |
| 4,785,147 A | * | 11/1988 | Mucha et al. | 219/640 |
| 5,412,183 A | | 5/1995 | Buffenoir et al. | |

FOREIGN PATENT DOCUMENTS

| | | |
|---|---|---|
| DE | 886 358 C | 8/1953 |
| DE | 886358 C | 8/1953 |
| FR | 997 733 A | 1/1952 |

(Continued)

*Primary Examiner* — Quang Van
(74) *Attorney, Agent, or Firm* — Philip O. Post (57) ABSTRACT

An apparatus and process are provided for multi-frequency induction heat treatment of workpieces including gears. High frequency power is applied to an induction coil that surrounds the workpiece so that a high frequency magnetic field couples with the workpiece to inductively heat the workpiece. A C-core inductor is coupled to a coil that has low frequency power applied to it. The workpiece is inserted in a gap in the C-core inductor magnetic circuit so that it experiences low frequency Joule effect heating when the low frequency current is applied to the coil coupled with the C-core inductor. Alternatively the workpiece may be inserted around the C-core inductor when the workpiece has an opening.

22 Claims, 9 Drawing Sheets

(56) References Cited

FOREIGN PATENT DOCUMENTS

| FR | 997733 A | 1/1953 |
| GB | 979 069 A | 1/1965 |
| GB | 979069 A | 1/1965 |
| JP | 2001-006864 A | 1/2001 |

* cited by examiner

PRIOR ART

MULTI-FREQUENCY HEAT TREATMENT OF A WORKPIECE BY INDUCTION HEATING

CROSS REFERENCE TO RELATED APPLICATIONS

This is a divisional application of application Ser. No. 11/111,419 filed Apr. 21, 2005, which claims the benefit of U.S. Provisional Application No. 60/564,083 filed Apr. 21, 2004, both of which are hereby incorporated herein by reference in their entireties.

FIELD OF THE INVENTION

The present invention relates to heat treatment of an electrically conductive workpiece wherein a combination of two distinct forms of induction heating at different frequencies is used to accomplish the heat treatment.

BACKGROUND OF THE INVENTION

A gear, or other workpiece, may be inductively heat treated by passing an ac current through an induction coil. The current creates a magnetic field around the coil that magnetically couples with the gear to induce eddy current in the gear. Induction hardening of gears provides a martensitic layer at the tooth surface of the gear to increase hardness and wear resistance while allowing the remainder of the gear to be unaffected by the process. The increase in hardness also improves contact fatigue strength and other mechanical properties. The geometrical complexity of gears and variation in electromagnetic coupling between the induction coil, and tooth tip and root fillet, results in different induced heat intensities in the tip versus the root of the gear.

Figures 1A, 1B:
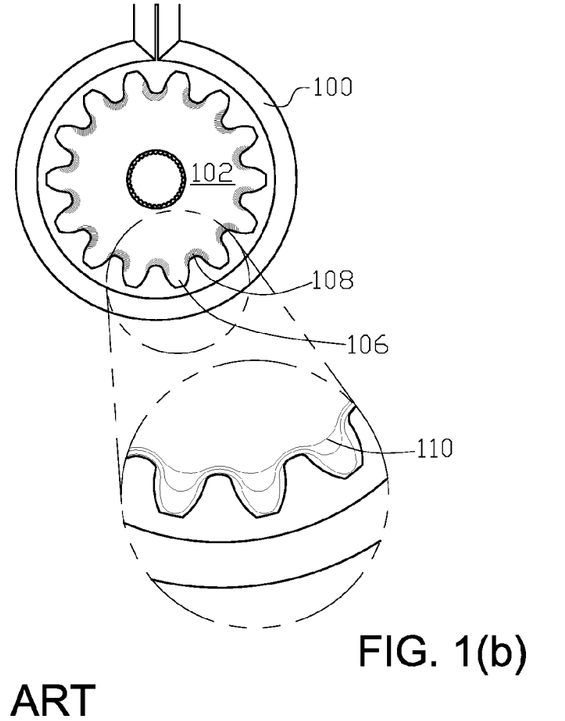
FIG. 1(a) illustrates typical eddy current flow and gear induction heating profiles with a high frequency current.
FIG. 1(b) illustrates typical eddy current flow and gear induction heating profiles with a low frequency current.
Figure 1A:
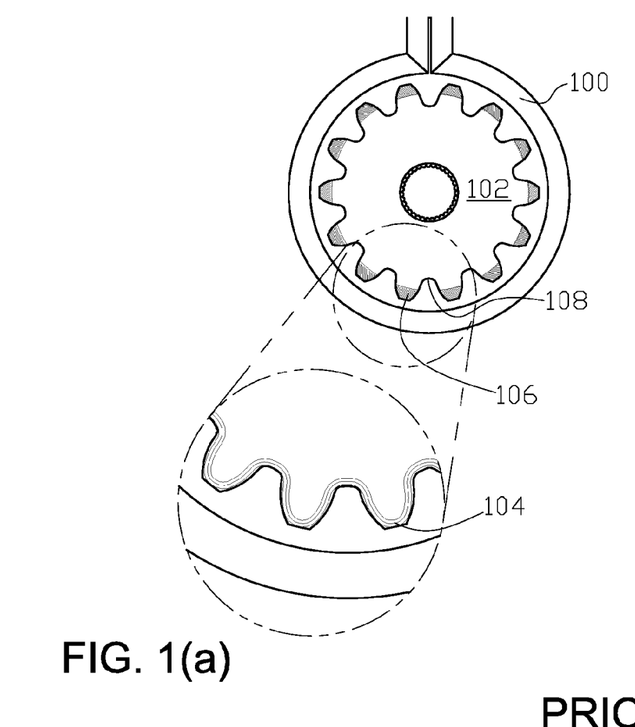

Frequency of the current makes a noticeable effect on eddy current flow within the gear and heat distribution. Basically when it is necessary to harden the tooth tips only with a single frequency of current using a single-turn or multi-turn solenoid coil, a relatively high frequency (e.g. 30 kHz to 450 kHz) and high power density are applied. See for example FIG. 1(a). When relatively high frequency current (power) is applied to coil 100, eddy current induced heating in gear 102 follows the contour of the gear as indicated by representative heating profile lines 104. Since the highest concentration of the current density will be in the tip of tooth 106, there will be a power surplus in the tip compared to root 108. Taking also into account that the tip of the tooth has the minimum amount of metal to be heated compared to root 108, the tip will experience the most intensive temperature rise over the entire heating cycle. In addition, from the thermal perspective, the amount of metal beneath the gear root represents a much greater heat sink compared to the tooth tip. Another factor that also complements the more intensive heating of the tooth tip deals with a better electromagnetic coupling due to the electromagnetic proximity effect between the inductor coil and tooth tip in comparison to the root; higher frequency has a tendency to make the proximity effect more pronounced.

When inductively hardening tooth root 108, a relatively low frequency (e.g., 50 Hz to 20 kHz) is preferable. With a low frequency, the eddy current penetration depth is much greater than with high frequency. When heating fine pitch and medium pitch gears it is much easier for low frequency induced current to make a short path and follow the base circle or root line of the gear instead of following the tooth profile. See for example FIG. 1(b) and representative heating profile lines 110. The result is more intensive heating of the root fillet area compared to the tip of the tooth.

Typically, in order to provide a hardness pattern that follows the profile of the gear tooth (from tip to root) preheating of the gear is required. Depending upon the gear geometry, preheating is usually accomplished by using a medium or low frequency (e.g. less than 20 kHz). High frequency (e.g. 30 kHz through 450 kHz) is applied during the final heating stage.

Figure 2:
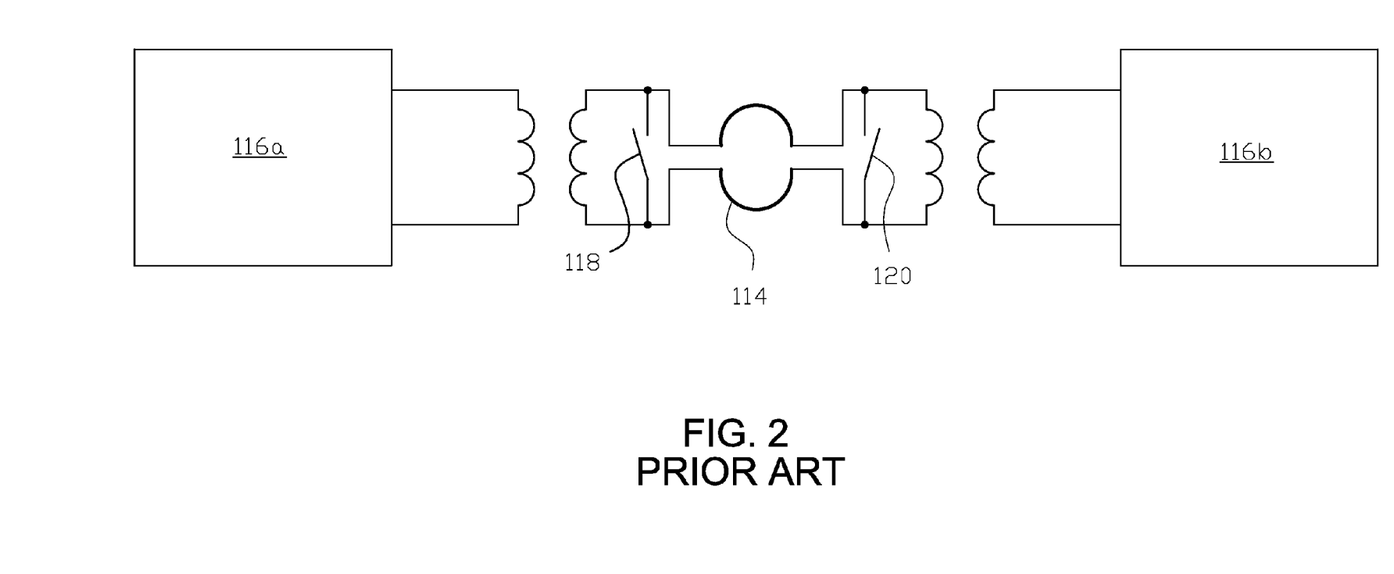
FIG. 2 illustrates one prior art method of sequential induction preheating and final heating of a workpiece.

FIG. 2 illustrates one prior art method of inductive heating that utilizes a single coil 114 and two inverters 116a and 116b that are sources of low (or medium) frequency power, at low power density, and high frequency power, at high power density, respectively. The salient steps of the method are: place a gear within coil 114; rotate the gear; apply low frequency current from inverter 116a (by opening contacts 118 and closing contacts 120) to the coil to inductively preheat the gear; disconnect the coil from inverter 116a (by closing contacts 118) and apply high frequency current from inverter 116b (by opening contacts 120) to heat the gear to hardening temperature; remove the high frequency current from the gear; and quench the gear. Major drawbacks of this method is the system's low reliability and high cost. High currents are required for induction heating, and high current electromechanical contacts usually have a short life. Longer lasting electronic switches can be used in lieu of mechanical switches, but this would increase the overall cost of the system.

Figure 3:
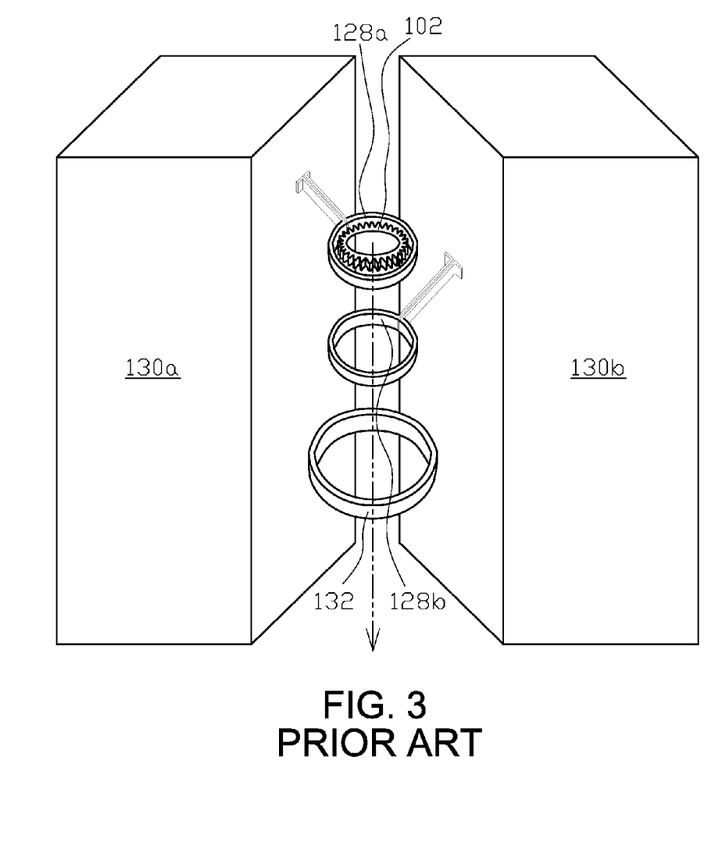
FIG. 3 illustrates another prior art method of sequential induction preheating and final heating of a workpiece.

FIG. 3 illustrates another prior art method of inductive heating that utilizes two coils, namely preheat coil 128a and final heat coil 128b, and two inverters 130a and 130b. Medium frequency power inverter 130a supplies power to the preheat coil at low power density and high frequency power inverter 130b supplies power to the final heat coil at high power density. In this method gear 102 is sequenced by a suitable mechanical transfer system (in direction of arrow shown in FIG. 3) through preheat coil 128a, final heat coil 128b and quench ring 132 to harden gear 102 (shown in preheat coil). A major drawback of this method is that a short time between preheating and final heating (e.g. less than 1 second) may be required. This results in increased equipment cost, since the mechanical transfer system must be of a precision design for fast (fraction of a second) and accurate gear transfer from the preheating position to the final heat position.

In another prior art method simultaneous dual frequency power supply is used for gear hardening, for example, as disclosed in U.S. Pat. No. 2,444,259 (Method of High Frequency Induction Heating). The output of the simultaneous dual frequency power supplies consists of two appreciably different frequencies. One of frequencies provides heating of the root fillet and the other frequency provides heating of the tooth contour. A major drawback of this simultaneous dual frequency heating method is that the shape of the single coil cannot be optimized for both frequencies.

One objective of the present invention is improving the uniformity of induction hardening of gears (in particular, but not limited to, conical gears and pinion gears) and the reduction of gear distortion by using a relatively low frequency C-core type induction heating of the workpiece in combination with a relatively high frequency of induction heating of the workpiece using a separate induction coil.

BRIEF SUMMARY OF THE INVENTION

In one aspect, the present invention is an apparatus for, and method of, heat treating a workpiece by using a combination of two different types (configurations) of induction coils. The workpiece is inductively heated by a first ac current flow through a first induction coil that surrounds the workpiece.

The first ac current establishes a magnetic field that inductively couples with the workpiece. The workpiece is also heated by placing the workpiece in an opening in a low frequency C-core type inductor that is coupled to a second induction coil that represents a primary winding. The second induction coil is connected to a second ac current source. The magnetic flux generated by the primary winding flows through the C-core (that acts as a magnetic flux diverter) and also through the workpiece. This induces a current in the workpiece that heats the workpiece due to the Joule effect. Basically the same magnetic flux will flow though the laminated C-core and through the heated component. However, since the C-core is made from a laminated magnetic material, or a powder-based magnetic material, it has a much higher electrical resistivity to the induced eddy current. This results in a drastically reduced amount of induced eddy current in the C-core compared to the eddy current induced within the workpiece, and consequently, more intense heating of the workpiece than the C-core. Generally the first ac current is higher in frequency than the second ac current. Inductive heating of the workpiece using eddy currents generated by a first ac source and the second ac source may be simultaneous or non-simultaneous.

Other aspects of the invention are set forth in this specification and the appended claims.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 4:
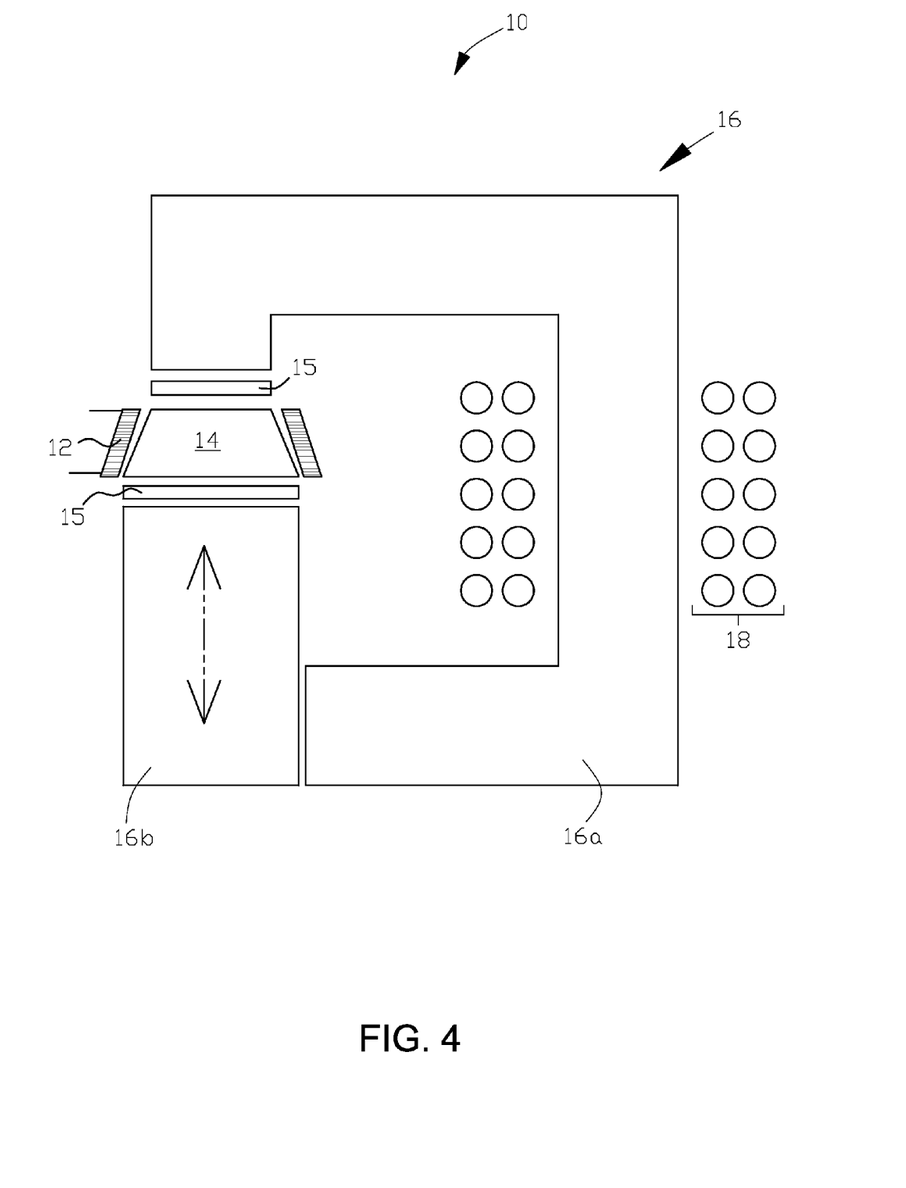
FIG. 4 illustrates one example of the multi-frequency heat treatment apparatus of the present invention.

There is shown in FIG. 4 one example of the induction heat treating apparatus 10 of the present invention. While workpiece 14 illustrated in FIG. 4 is diagrammatically represented as a pinion gear, the induction heat treating apparatus of the present invention is also applicable to other types of gears, and other types of electrically conductive workpieces. High frequency (HF) solenoidal coil 12 at least partially surrounds workpiece 14. Coil 12 may be a single or multi-turn coil. Low frequency C-core inductor 16 comprises a stationary core segment 16a and moveable core segment 16b. The low frequency core may be formed from magnetic materials known in the art, such as a laminated magnetic material, or a powder-based magnetic material, such as a ferrite or iron based material. Low frequency (LF) solenoidal coil 18 surrounds a portion of stationary core segment 16a.

HF solenoidal coil 12 is suitably connected to a power source of high frequency current (not shown in the figure) and LF solenoidal coil 18 is suitably connected to a power source of low frequency current (not shown in the figure). The HF magnetic field generated by the flow of high frequency current in HF solenoidal coil 12 magnetically couples with workpiece 14 to achieve high frequency induction heating of the workpiece.

The LF magnetic field generated by the flow of low frequency current in LF solenoidal coil 18 magnetically couples with C-core inductor 16 to induce a low frequency magnetic field in the C-core. Since workpiece 14 is disposed in the gap in the C-core inductor, the workpiece forms a part of the magnetic circuit. Since workpiece 14 is generally not laminated or otherwise formed to inhibit low frequency current flow through it, low frequency induced current will flow through the workpiece to heat it by the Joule effect, while the low frequency C-core remains relatively unheated. When the workpiece temperature is below the Curie point there will be an additional heating generated by hysteresis losses.

Flux concentrators 15, as known in the art, can be used to focus on the ends of the workpiece to allow an appropriate distribution of the electromagnetic field in the C-core end areas, and at the same time, provide space for the HF solenoidal coil to be simultaneously positioned around the outside diameter of the gear. The workpiece can be inductively heated by simultaneous or non-simultaneous application of the HF magnetic field to the workpiece and the LF magnetic field to the C-core while the workpiece is in the gap of the C-core. Non-simultaneous applications may be accomplished by a number of different methods. For example, inductive heating using the high frequency solenoid coil and low frequency C-core coil may be sequential in time, or partially overlapped in time.

In the prior art as discussed above, unlike in the present invention, a LF solenoidal coil is used to accomplish low frequency induction heating. Skin effect and proximity effect both define the induction heating temperature profile when using a LF solenoidal coil that wraps around the outside of a tapered gear such as pinion gears. Proximity effect draws the current flow within the gear to the surfaces closest to the coil. Because a pinion gear is tapered, the current will flow more in the large diameter portion of the gear and less in the small diameter portion. This uneven heating due to unequal electromagnetic coupling or proximity effect can be somewhat compensated for by tapering the inside diameter of the LF solenoidal coil to match the taper of the pinion. This approach is very position sensitive and seldom results in good uniformity.

Only skin effect and the geometry of flux concentrators located at the end areas define the low frequency heating temperature profile within a tapered gear such as a pinion when using a C-core inductor as in the present invention. Skin effect causes the induced current to flow near the outer surface of the gear. The higher the frequency, the nearer to the outer surface the current will flow, causing more shallow heating and conversely, inducing current at lower frequency, will result in deeper current flow and subsurface heating. The lack of proximity effect when using a C-core inductor therefore allows for a much more uniform heating along the taper of the pinion. While the use of a C-core inductor for low frequency heating in the present invention has important advantages over more conventional heating with a solenoid-type induction coil when heating tapered gears including pinions, the scope of the invention is not limited to heating those types of workpieces.

Successive workpieces can be loaded into the heating position shown in FIG. 4 by: lowering moveable (drop-down) core segment 16b with a suitable mechanical transfer system to remove a hardened workpiece; inserting a non-heat treated workpiece in its place; and raising the moveable core segment so that the non-heat treated workpiece is positioned as shown in FIG. 4 for the heat treating process.

Figure 5:
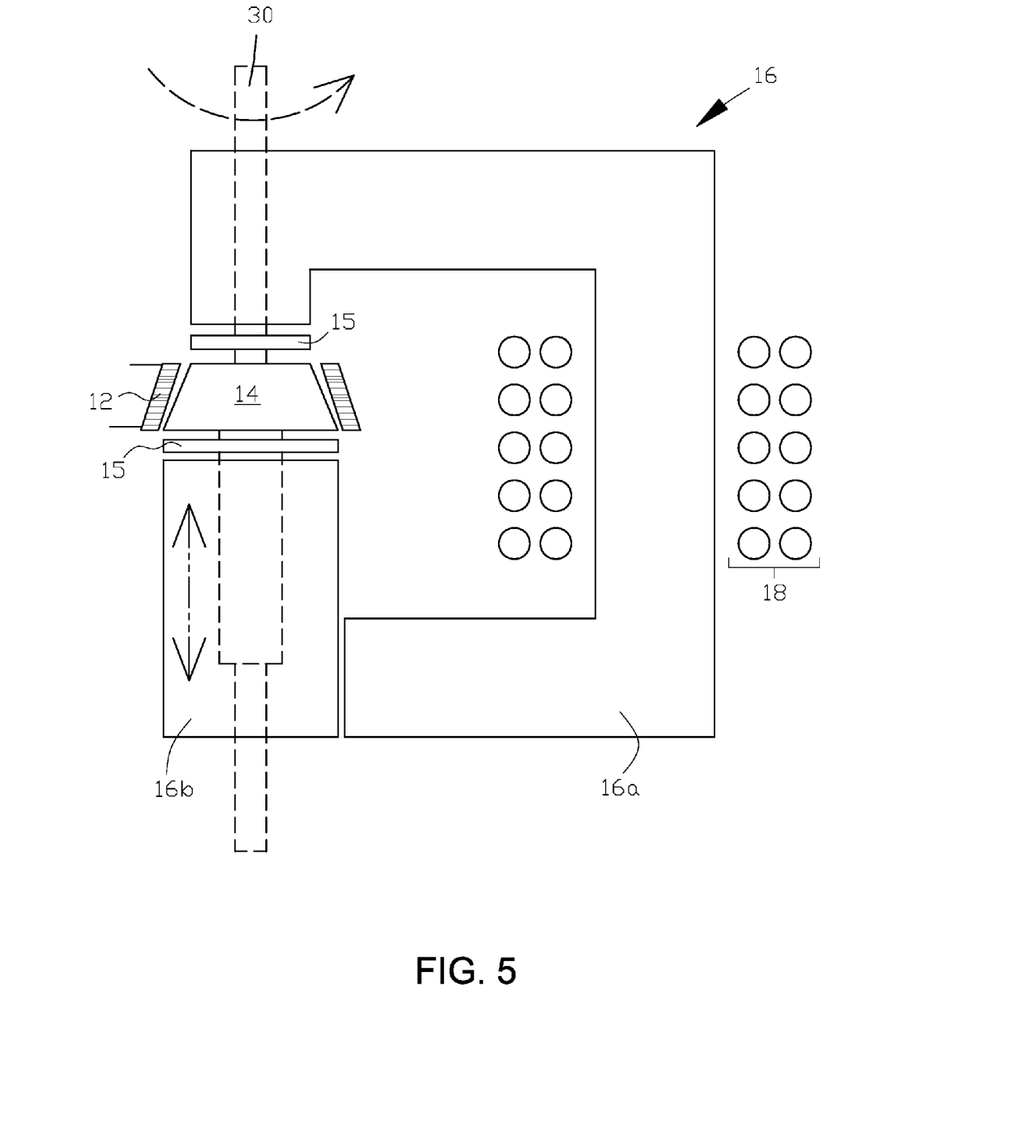
FIG. 5 illustrates another example of the multi-frequency heat treatment apparatus of the present invention.

In other examples of the invention the workpiece is located between centering elements 30 that are part of the C-core circuit shown in FIG. 5. The centering elements provide a means for holding and rotating the workpiece during the heating process. In this non-limiting example of the invention the centers are positioned through the C-core inductor. In order to reduce undesirable heating of the centering elements, the centering elements preferably comprise non-magnetic materials, such as a non-magnetic stainless steel.

Figure 6:
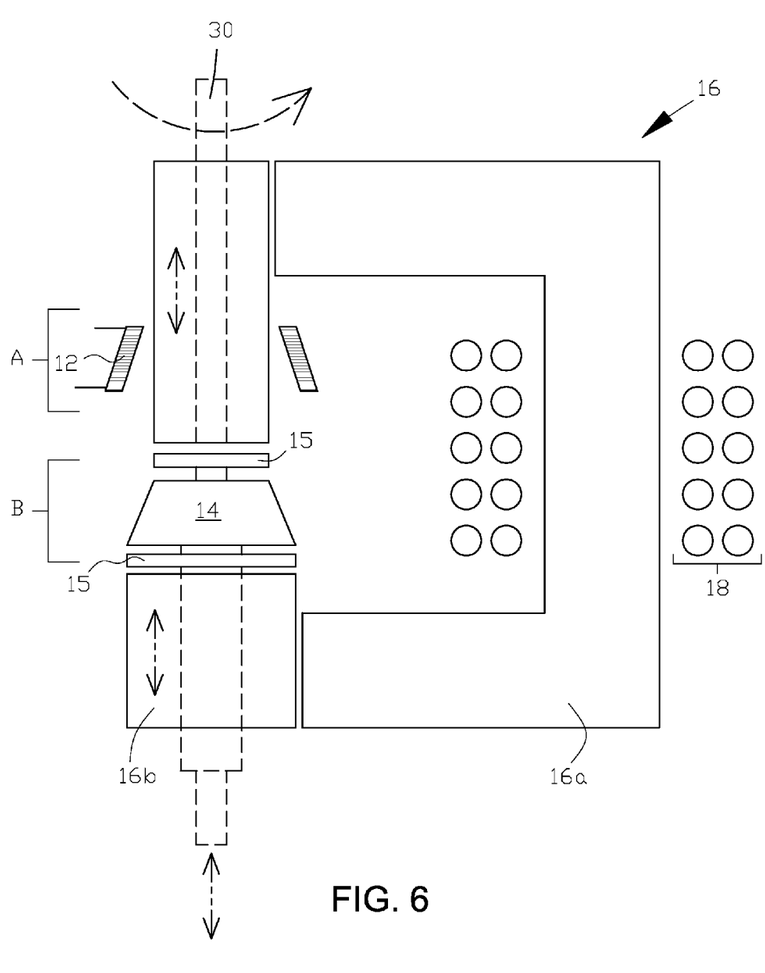
FIG. 6 illustrates another example of the multi-frequency heat treatment apparatus of the present invention.

FIG. 6 illustrates another example of the induction heating apparatus of the present invention. In this arrangement sufficient moveable C-core segment 16b is provided to allow vertical movement of the workpiece 14 so that the workpiece can alternatively be brought within HF solenoidal coil 12 and removed therefrom for LF induction heating of the workpiece or vice versa. When the workpiece is not within the HF solenoidal coil as shown in FIG. 6 (LF heating position designated "B" in FIG. 6) induction heating by the C-core circuit can be accomplished; when the workpiece is disposed within HF solenoidal coil 12 (HF heating position designated "A" in FIG. 6) the HF magnetic field causes the workpiece to be inductively heated.

Figure 7:
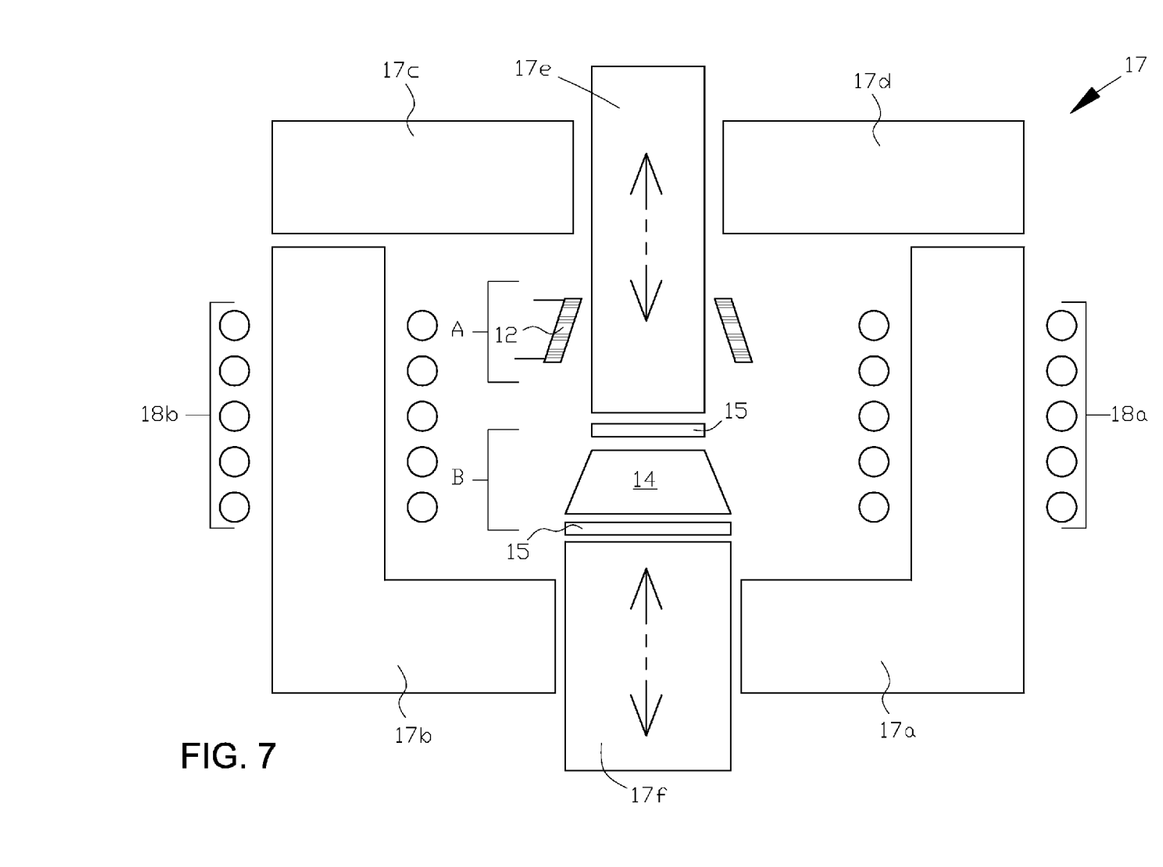
FIG. 7 illustrates another example of the multi-frequency heat treatment apparatus of the present invention.
Figure 8:
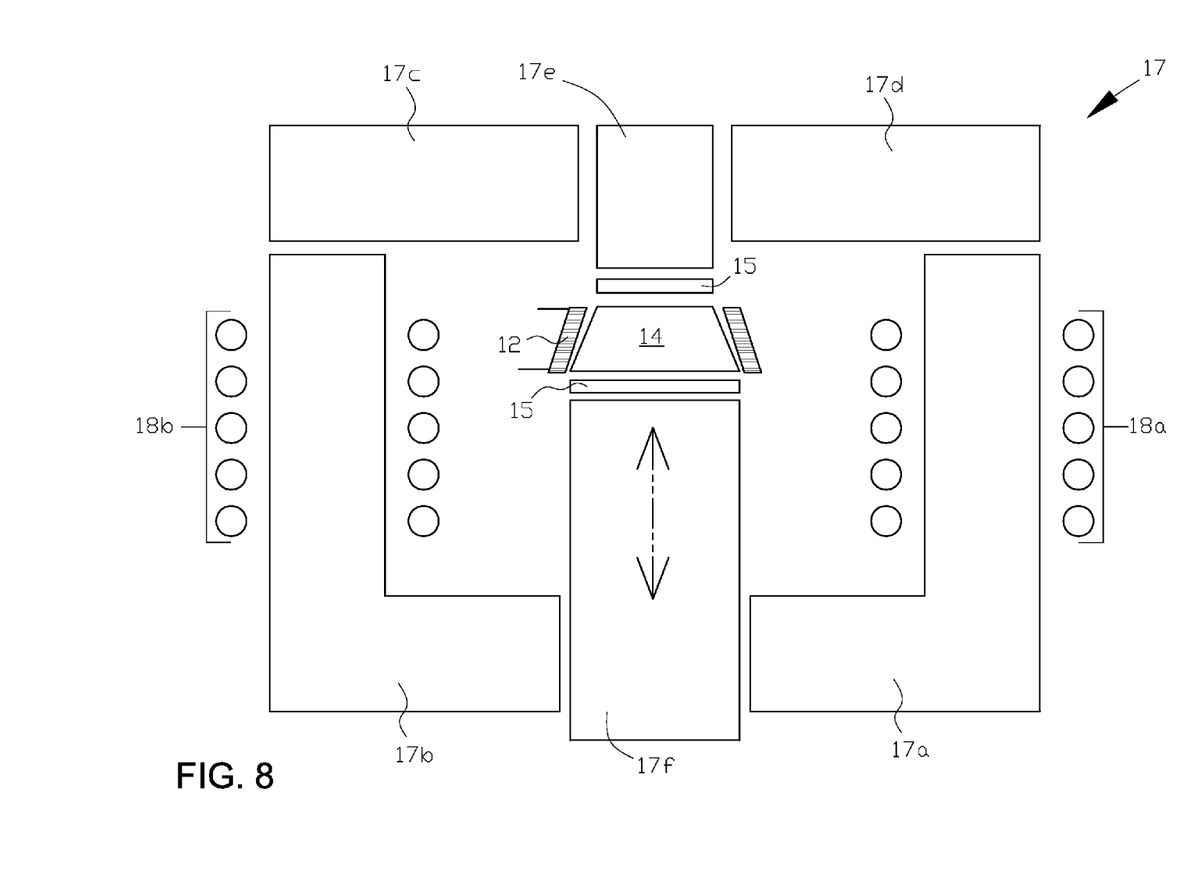
FIG. 8 illustrates another example of the multi-frequency heat treatment apparatus of the present invention.

In other examples of the invention, as shown in FIG. 7 and FIG. 8, a double C-core inductor 17, comprising fixed core segments 17a, 17b, 17c and 17d, and moveable core segments 17e and 17f. Each of the C-core inductors can be provided with a LF solenoidal coil. By way of the non-limiting example in FIG. 7, LF solenoidal coils 18a and 18b are wound around fixed core segments 17a and 17b, respectively. Coils 18a and 18b are preferably connected in series, but may also be connected in parallel, to a suitable common power source of low frequency current (not shown in the figure). The example of the invention in FIG. 7 also incorporates separate upper and lower positions for LF and HF inductive heating, respectively, as also illustrated in FIG. 6.

FIG. 8 is similar to FIG. 7 except that rather than using separate LF and HF inductive heating stations, the workpiece is positioned between the two C-cores and in the HF solenoidal coil so that, if desired, simultaneous heating could be accomplished as previously discussed relative to FIG. 4.

Figure 9:
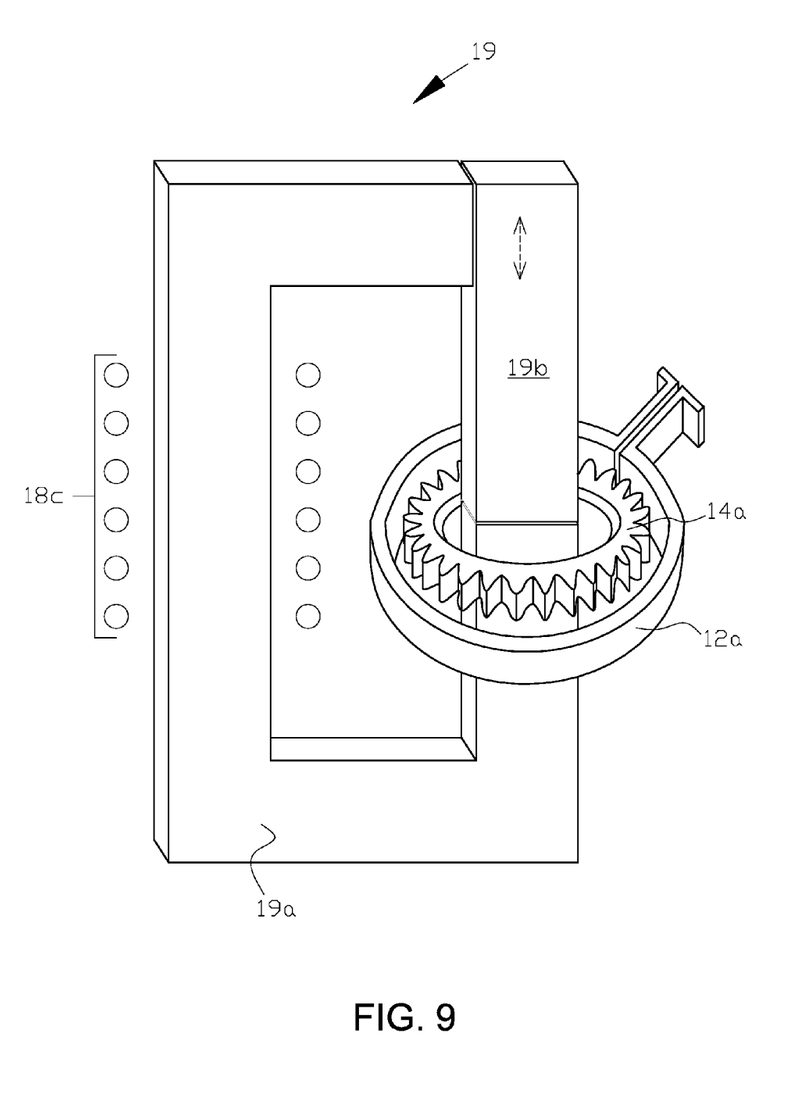
FIG. 9 illustrates another example of the multi-frequency heat treatment apparatus of the present invention.

FIG. 9 illustrates another example of the induction heating apparatus of the present invention. In this arrangement C-core inductor 19 comprises core segments 19a and 19b and workpiece 14a has an opening, such as but not limited to the gear shown in FIG. 9. LF solenoidal coil 18c surrounds a section of the C-core inductor and is connected to a power source of low frequency current. HF solenoidal coil 12a (shown in this non-limiting example as a single turn coil) is connected to a power source of high frequency current. The flow of low frequency current in LF solenoidal coil 18c establishes a magnetic field that couples with the C-core inductor, which in turn, magnetically couples with workpiece 14a when it is inserted in the C-core inductor through its opening, to inductively heat the workpiece. The flow of high frequency current in HF solenoidal coil 12a establishes a magnetic field that couples with workpiece 14a when the workpiece is brought within the vicinity of the field, to inductively heat the workpiece. Low frequency and high frequency heating may be accomplished simultaneously or alternatively by either moving the workpiece away from the HF solenoidal coil (low frequency heating only) or applying power to only the LF or HF solenoidal coil. A segment of the C-core inductor, representatively shown as core segment 19b in FIG. 9 may be moveable (illustrated by double headed arrow) to allow removal of the workpiece from the C-core inductor.

In all examples of the invention HF solenoidal coil 12 and 12a may be configured in other shapes than those shown in the figures. In the figures, since the non-limiting electrically conductive workpiece used is a pinion gear, the HF solenoidal coil assumes the shape of an open conic section to generally conform to the outer shape of the pinion gear. In other examples of the inventions, depending upon the workpiece and desired induction heating pattern, the HF solenoidal coil may be differently shaped. For example the inside perimeter of HF solenoidal coil 12 might not be parallel to an outside diameter of a pinion gear. Depending upon the application, a variation of the electromagnetic coupling between coil 12 and the surface of the workpiece can be used as an additional tool to control the heat distribution as known by one skilled in the art and without deviating from the scope of the present invention.

Although in the above examples of the invention a solenoidal coil is used for the HF induction coil, other types of induction coils are also suitable for use in the invention. For example, the HF coil may be a single-shot or channel type inductor where current would predominantly flow in the longitudinal direction compared to circumferential current induced by a solenoidal coil.

The terms "low frequency" and "high frequency" when used with the present invention, in the broadest sense, means that the "high frequency" is higher than the "low frequency." Typically but not by way of limitation the "high frequency" will be in the preferable range of 30 kHz to 450 kHz, and the "low frequency" will be in the preferable range of 50 Hz to 20 kHz.

While a moveable core segment is used in all of the above examples of the invention, in the examples wherein simultaneous LF and HF induction heating is possible (see e.g. FIG. 4, FIG. 5, and FIG. 8) the C-core inductor may comprise a totally stationary C-core while means are provided for movement of HF solenoidal coil 12 so that progressive workpieces may be inserted into the gap in the C-core inductor.

The foregoing examples do not limit the scope of the disclosed invention. The scope of the disclosed invention is further set forth in the appended claims.

The invention claimed is:

1. An apparatus for induction heat treatment of a workpiece, the apparatus comprising:
    an induction coil at least partially surrounding the workpiece;
    a generally C-core inductor comprising a first core segment and a second core segment, the workpiece disposed in a gap between the first core segment and the second core segment to form a magnetic circuit with the generally C-core inductor;
    a solenoidal coil wound around a section of the first core segment;
    a first power supply providing a first ac current to the induction coil to induce a first ac magnetic field around the induction coil, the first ac magnetic field coupling with the workpiece to inductively heat the workpiece; and
    a second power supply providing a second ac current to the solenoidal coil to induce a second ac magnetic field in the magnetic circuit to heat the workpiece by the Joule effect, the frequency of the second ac current lower than the frequency of the first ac current.

2. The apparatus of claim 1 further comprising at least one flux concentrator disposed in the vicinity of the space between an end of the workpiece facing the first or second core segment and the first or second core segment, respectively.

3. The apparatus of claim 1 further comprising means for moving either the first or second core segment and means for insertion and removal of the workpiece from the magnetic circuit.

4. The apparatus of claim 3 further comprising means for centering or rotating the workpiece when it forms a part of the magnetic circuit.

5. The apparatus of claim 4 further comprising means for moving the workpiece and either the first or second core segment to allow movement of the workpiece into or out of the induction coil while the magnetic circuit is opened or closed, respectively, to exclusively heat the workpiece either by the first ac current or the second ac current, respectively.

6. The apparatus of claim 5 wherein the frequency of the first power supply is between 30 kilohertz and 450 kilohertz and the frequency of the second power supply is between 50 Hertz and 20 kilohertz.

7. The apparatus of claim 1 further comprising means for centering or rotating the workpiece when it forms a part of the magnetic circuit.

8. The apparatus of claim 1 further comprising means for moving the workpiece and either the first or second core segment to allow movement of the workpiece into or out of the induction coil while the magnetic circuit is opened or closed, respectively, to exclusively heat the workpiece either by the first ac current or the second ac current, respectively.

9. The apparatus of claim 1 wherein the frequency of the first power supply is between 30 kilohertz and 450 kilohertz and the frequency of the second power supply is between 50 Hertz and 20 kilohertz.

10. An apparatus for induction heat treatment of a workpiece, the apparatus comprising:
an induction coil at least partially surrounding the workpiece;
a generally C-core inductor comprising a first core segment and a second core segment, the workpiece disposed in a gap between the first core segment and the second core segment to form a magnetic circuit with the generally C-core inductor;
a solenoidal coil wound around a section of the first core segment;
at least one flux concentrator disposed in the vicinity of the space between an end of the workpiece facing the first or second core segment and the first or second core segment, respectively;
a first power supply providing a first ac current to the induction coil to induce a first ac magnetic field around the induction coil, the first ac magnetic field coupling with the workpiece to inductively heat the workpiece; and
a second power supply providing a second ac current to the solenoidal coil to induce a second ac magnetic field in the magnetic circuit to heat the workpiece by the Joule effect, the frequency of the second ac current lower than the frequency of the first ac current.

11. The apparatus of claim 10 further comprising means for moving either the first or second core segment and means for insertion and removal of the workpiece from the magnetic circuit.

12. The apparatus of claim 10 further comprising means for centering or rotating the workpiece when it forms a part of the magnetic circuit.

13. The apparatus of claim 10 further comprising means for moving the workpiece and either the first or second core segment to allow movement of the workpiece into or out of the induction coil while the magnetic circuit is opened or closed, respectively, to exclusively heat the workpiece either by the first ac current or the second ac current, respectively.

14. The apparatus of claim 10 wherein the frequency of the first power supply is between 30 kilohertz and 450 kilohertz and the frequency of the second power supply is between 50 Hertz and 20 kilohertz.

15. An apparatus for induction heat treatment of a workpiece, the apparatus comprising:
an induction coil at least partially surrounding the workpiece;
a generally C-core inductor comprising a first core segment and a second core segment, the workpiece disposed in a gap between the first core segment and the second core segment to form a magnetic circuit with the generally C-core inductor;
a solenoidal coil wound around a section of the first core segment;
at least one flux concentrator disposed in the vicinity of the space between an end of the workpiece facing the first or second core segment and the first or second core segment, respectively;
a first power supply having a frequency of between 30 kilohertz and 450 kilohertz, the first power supply providing a first ac current to the induction coil to induce a first ac magnetic field around the induction coil, the first ac magnetic field coupling with the workpiece to inductively heat the workpiece; and
a second power supply having a frequency of between 50 Hertz and 20 kilohertz, the second power supply providing a second ac current to the solenoidal coil to induce a second ac magnetic field in the magnetic circuit to heat the workpiece by the Joule effect.

16. The apparatus of claim 15 further comprising means for moving either the first or second core segment and means for insertion and removal of the workpiece from the magnetic circuit.

17. The apparatus of claim 15 further comprising means for centering or rotating the workpiece when it forms a part of the magnetic circuit.

18. The apparatus of claim 15 further comprising means for moving the workpiece and either the first or second core segment to allow movement of the workpiece into or out of the induction coil while the magnetic circuit is opened or closed, respectively, to exclusively heat the workpiece either by the first ac current or the second ac current, respectively.

19. An apparatus for induction heat treatment of a workpiece, the apparatus comprising:
an induction coil at least partially surrounding the workpiece;
a generally C-core inductor comprising a first core segment and a second core segment, the workpiece disposed in a gap between the first core segment and the second core segment to form a magnetic circuit with the generally C-core inductor;
a solenoidal coil wound around a section of the first core segment;
a first power supply providing a first ac current to the induction coil to induce a first ac magnetic field around the induction coil, the first ac magnetic field coupling with the workpiece to inductively heat the workpiece;

a second power supply providing a second ac current to the solenoidal coil to induce a second ac magnetic field in the magnetic circuit to heat the workpiece by the Joule effect, the frequency of the second ac current lower than the frequency of the first ac current; and means for moving either the first or second core segment and means for insertion and removal of the workpiece from the magnetic circuit.

20. The apparatus of claim 19 further comprising means for centering or rotating the workpiece when it forms a part of the magnetic circuit.

21. The apparatus of claim 19 further comprising means for moving the workpiece and either the first or second core segment to allow movement of the workpiece into or out of the induction coil while the magnetic circuit is opened or closed, respectively, to exclusively heat the workpiece either by the first ac current or the second ac current, respectively.

22. The apparatus of claim 19 wherein the frequency of the first power supply is between 30 kilohertz and 450 kilohertz and the frequency of the second power supply is between 50 Hertz and 20 kilohertz.

* * * * *